(12) United States Patent
Son et al.

(10) Patent No.: US 7,613,293 B2
(45) Date of Patent: Nov. 3, 2009

(54) HINGE APPARATUS FOR A PORTABLE TERMINAL AND PORTABLE TERMINAL HAVING THE SAME

(75) Inventors: Ki-Bok Son, Gumi-si (KR); Byung-Yeol Ko, Gumi-si (KR); Jong-Hwan Choi, Seoul (KR)

(73) Assignee: Samsung Electronics Co., Ltd., Suwon, Gyeonggi-do (KR)

( * ) Notice: Subject to any disclaimer, the term of this patent is extended or adjusted under 35 U.S.C. 154(b) by 359 days.

(21) Appl. No.: 11/758,481

(22) Filed: Jun. 5, 2007

(65) Prior Publication Data
US 2008/0118057 A1    May 22, 2008

(30) Foreign Application Priority Data
Nov. 16, 2006    (KR) ............... 10-2006-0113297

(51) Int. Cl.
*H04M 1/00* (2006.01)
*H04M 9/00* (2006.01)

(52) U.S. Cl. ..................... 379/433.11; 379/433.13; 455/575.3

(58) Field of Classification Search ............ 379/433.11, 379/433.13; 455/90.3, 575.3; 16/304, 327, 16/330
See application file for complete search history.

(56) References Cited

U.S. PATENT DOCUMENTS 6,292,980 B1    9/2001    Yi et al.

FOREIGN PATENT DOCUMENTS

| KR | 1020050031563 A | 4/2005 |
|---|---|---|
| KR | 1020050032788 A | 4/2005 |

*Primary Examiner*—Tuan D Nguyen
(74) *Attorney, Agent, or Firm*—Jefferson IP Law, LLP

(57) ABSTRACT

A hinge apparatus for connecting a first housing and a second housing of a portable terminal is provided. The hinge apparatus includes a hinge housing and a damping member. The hinge housing is connected to the second housing and has an internal wall formed with one or more guide grooves extending in a circumferential direction of the hinge housing. The damping member is rotatably received in the hinge housing and rotates as the second housing rotates. The damping member has one or more frictional projections. In a first section corresponding to the position where the second housing is folded onto the first housing, the frictional projections contact the internal wall of the hinge housing. Similarly, in another section corresponding to the position where the rotation of the second housing is stopped after rotating away from the first housing, the frictional projections also contact the internal wall of the hinge housing. As a result, the hinge apparatus dampens impact produced at the moment the housings are folded or stopped after rotating away from each other, thereby improving the endurance and structural stability of the portable terminal.

31 Claims, 4 Drawing Sheets

HINGE APPARATUS FOR A PORTABLE TERMINAL AND PORTABLE TERMINAL HAVING THE SAME

PRIORITY

This application claims the benefit under 35 U.S.C. § 119 (a) of a Korean patent application filed in the Korean Industrial Property Office on Nov. 16, 2006 and assigned Serial No. 2006-113297, the entire disclosure of which is hereby incorporated by reference.

BACKGROUND OF THE INVENTION

1. Field of the Invention

The present invention relates to a portable terminal. More particularly, the present invention relates to a hinge apparatus for a portable terminal which interconnects a pair of housings in such a manner that the housings are capable of rotating either toward one another or away from each other.

2. Description of the Related Art

Typically, portable terminals may be classified as bar-type, flip-type, or folder type terminals.

A bar-type terminal is a type of portable terminal that includes a single body housing having input/output means and receiver/transmitter modules. The input means, typically a key pad, is always exposed in this type of terminal, which may result in malfunctions. Furthermore, in such a bar-type terminal, there is a limit to the potential size reduction of the terminal because a certain distance must be provided between the receiver module and the transmitter module.

A flip-type terminal is a type of portable terminal that includes a body, a flip and a hinge apparatus interconnecting the body and the flip so that they are opposed to each other. The data input/output means and receiver/transmitter modules are provided in the body. The flip covers the data input means, typically a key pad, to prevent malfunctions. However, similar to the bar-type terminals, there is a limit to the size reduction of flip-type terminals due to the requirement for a certain distance between the transmitter module and the receiver module.

A folder-type terminal is a type of portable terminal that includes a body, a folder, and a hinge apparatus for rotatably interconnecting the body and the folder. The folder-type terminal is opened and closed by rotating the folder. When the folder is closed with respect to the body, the folder-type terminal is set to a standby mode, and malfunctions of the data input means (i.e., the key pad) can be prevented. In addition, the transmitter module and the receiver module are provided in the body and the folder, respectively. Therefore, when the folder is opened to enter a communication mode, it is possible to secure a sufficient distance between the transmitter module and the receiver module.

A conventional hinge apparatus is disclosed in Korean Patent Registration No. 296,038 issued on May 7, 2001, which corresponds to U.S. Pat. No. 6,292,980 issued on Sep. 25, 2001, to the assignee of the present application. The disclosed hinge apparatus includes a hinge cam and a hinge shaft which are formed with peaks and valleys respectively, and a coil spring for urging the hinge cam and the hinge shaft to contact each other. These components are received within a hinge housing so that a folder or flip can be opened or closed by using the elastic force of the coil spring and the curved surfaces of the peaks and valleys.

In this type of conventional hinge device that converts an elastic force provided by an elastic member into a rotational force, the intensity of the rotational force cannot be adjusted. Therefore, this type of hinge device produces an impact at the moment the folder or the flip is either folded onto the body (i.e., completely closed) or at the moment the folder is stopped when the folder or the flip is completely opened. The weight of the folder (which is provided with a display device such as a liquid crystal display) and the rotational inertia of the folder increase the impact force. The impacts produced by opening and closing the terminal not only damages the display device and the circuit devices of the terminal, but also cumulatively increases fatigue at the hinged areas between the body and the folder or between the body and the flip as the impact is repeated. Consequently, the impact may cause a fracture of the terminal. It is necessary to perform tests requiring the terminals to be opened and closed terminals hundreds of thousands to millions of times before shipping products so as to verify the endurance against fracture, and the structural stability of the terminals when opening and closing the terminals. As a result, the cost of manufacturing the terminals increases. Furthermore, the maintenance and repair costs increase due to the fractures of the terminals or damage to the circuit devices of the terminals.

SUMMARY OF THE INVENTION

An aspect of the present invention is to address at least the above-mentioned problems and/or disadvantages and to provide at least the advantages described below. Accordingly, an aspect of the present invention is to provide a hinge apparatus for a portable terminal capable of dampening an impact produced when the terminal is opened or closed, and a method of operating a portable having such a hinge apparatus.

Another aspect of the present invention is to provide a hinge apparatus for a portable terminal capable of dampening an impact produced when the portable terminal is opened or closed, so as to improve the endurance and structural stability of the portable terminal and to reduce manufacturing, maintenance, and repair costs, and a method of operating a portable having such a hinge apparatus.

In accordance with an aspect of the present invention, a hinge apparatus for a portable terminal having a first housing and a second housing folded onto the first housing to be opposed to the first housing or rotated away from the first housing is provided. The hinge apparatus rotatably connects the second housing to the first housing and provides a driving force for urging the second housing to be folded onto the first housing or to be rotated away from the first housing, depending on the rotational angle of the second housing. The hinge apparatus includes a hinge housing and a damping member. The hinge housing is associated with the second housing and has an internal wall with one or more guide grooves extending in a circumferential direction. The damping member is rotatably received in the hinge housing and rotates as the second housing rotates. The damping member has one or more frictional projections. In a first section extending in a direction away from the position where the second housing is folded onto the first housing, the frictional projections contact the internal wall of the hinge housing. In a second section extending in the direction of the second housing moving away from the first housing from an end of the first section, the one or more guide grooves are positioned so that the one or more frictional projections are received in the one or more guide grooves and move along the one or more guide grooves in the second section. In a third section extending from an end of the second section to a position where the second housing is stopped to rotate after rotating away from the first housing, the frictional projections contact the internal wall of the hinge housing.

In accordance with another aspect of the present invention, a portable terminal having a first housing, a second housing rotatable relative to the first housing, and a hinge apparatus rotatably connecting the second housing to the first housing and providing a driving force for urging the second housing to be folded onto the first housing or to be rotated away from the first housing, depending on the rotational angle of the second housing, is provided. The hinge apparatus includes a first section in which the hinge apparatus provides a driving force for rotating the second housing in a direction for urging the second housing to be folded onto the first housing, a third section in which the hinge apparatus provides a driving force for urging the second housing to be rotated away from the first housing, and a second section provided between the first and third sections. In the second section, the hinge apparatus provides a driving force for urging the second housing to be folded onto the first housing or to be rotated away from the first housing, depending on the rotational angle of the second housing in the second section. When the second housing rotates toward the first housing, the hinge apparatus provides a frictional force in the first section, and when the second housing rotates away from the first housing, the hinge apparatus provides a frictional force in the third section.

In accordance with yet another aspect of the present invention, a portable terminal having a first housing, a second housing rotatable relative to the first housing, and a hinge apparatus rotatably connecting the second housing to the first housing and providing a driving force for urging the second housing to be folded onto the first housing or to be rotated away from the first housing, depending on the rotational angle of the second housing, is provided. The hinge apparatus includes a first section in which the hinge apparatus provides a driving force for rotating the second housing in a direction for urging the second housing to be folded onto the first housing, a third section in which the hinge apparatus provides a driving force for urging the second housing to be rotated away from the first housing, and a second section provided between the first and third sections. In the second section, the hinge apparatus provides a driving force for urging the second housing to be folded onto the first housing or to be rotated away from the first housing, depending on the rotational angle of the second housing in the second section. The hinge apparatus provides a frictional force in the first and third sections while the second housing is rotating.

BRIEF DESCRIPTION OF THE DRAWINGS

The above and other aspects, features and advantages of the present invention will be more apparent from the following detailed description of certain exemplary embodiments taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of the exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
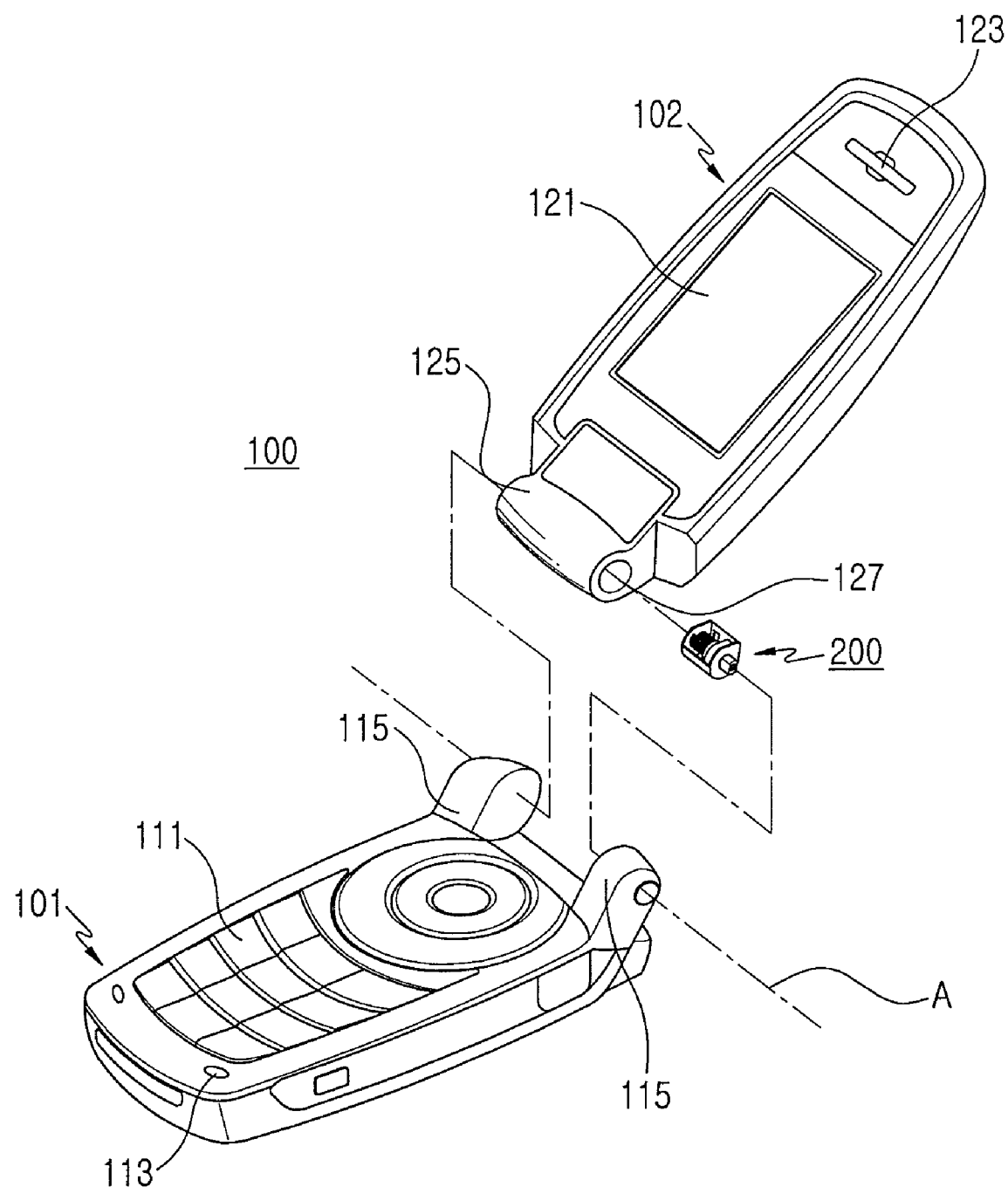
FIG. 1 is an exploded perspective view of a portable terminal having a hinge apparatus according to an exemplary embodiment of the present invention.
Figure 2:
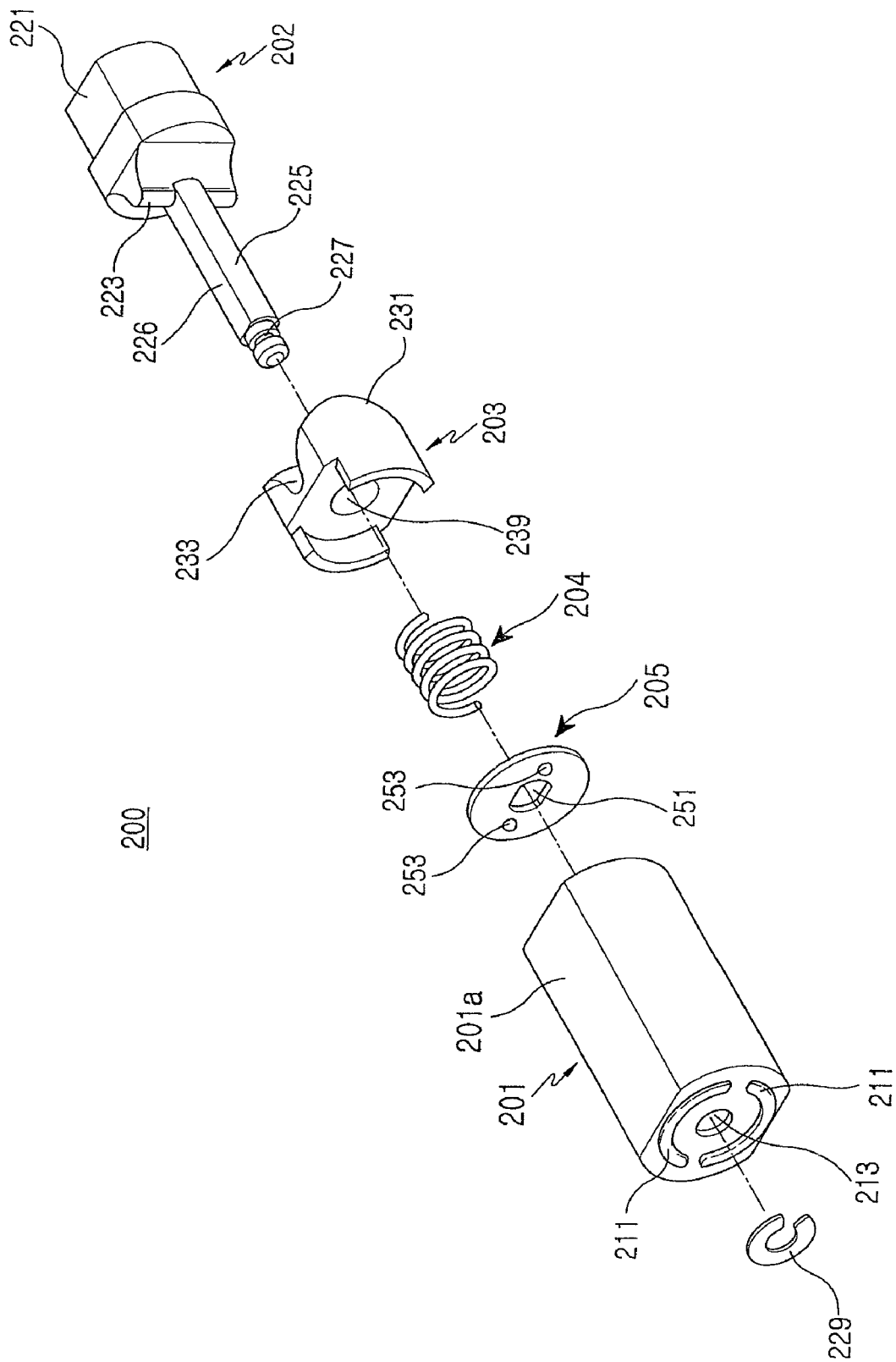
FIG. 2 is an exploded perspective view of the hinge apparatus of the portable terminal illustrated in FIG. 1.

FIG. 1 is an exploded perspective view of a portable terminal 100 having a hinge apparatus 200 according to an exemplary embodiment of the present invention, and FIG. 2 is an exploded perspective view of the hinge apparatus 200 in FIG. 1.

The hinge apparatus 200 can be applied to both a flip-type terminal and a folder-type terminal. However, in the following description of exemplary embodiments of the present invention, a folder-type terminal will be described for illustrative purposes.

Referring to FIG. 1, the portable terminal 100 includes a first housing 101, and a second housing 102. One end of the second housing 102 is rotatably connected to the first housing 101 by the hinge apparatus 200. The second housing 102 may be rotated away from the first housing 101 (i.e., opened) or rotated toward the first housing 101 (i.e., closed).

The first hinge housing 101 has a key pad 111 and a transmitter 113 provided on a face thereof, and when the second housing 102 is rotated, the key pad 111 and the transmitter 113 are opened or closed. In addition, the top end of the first housing is provided with a pair of side hinge arms 115 which are opposed to each other.

The second housing 102 has a display device 121 and a receiver 123 provided on a face thereof. The face of the second housing 102 is opposed to the first housing 101 when the second housing 102 is rotated toward the first housing 101. The display device 121 and the receiver 123 are also opened or closed like the key pad 111 and the transmitter 113 when the second housing 102 is rotated. The second housing 102 is formed with a center hinge arm 125 at one end thereof, which is rotatably engaged between the side hinge arms 115. As such, a hinge axis A of the terminal 100 is formed, and the second housing 102 is rotated about the hinge axis A.

The center hinge arm 125 is formed with a hinge hole 127 at one end thereof so as to provide a space for mounting the hinge apparatus, and mounted with a hinge dummy (not shown) at the other end. The hinge apparatus 200 and the hinge dummy engage the side hinge arms 115. Consequently, the center hinge arm 125 is rotatably engaged between the side hinge arms 115 by the hinge apparatus 200 and the hinge dummy.

The construction of the hinge apparatus 200 will now be described with reference to FIGS. 2 to 4.

Figure 3:
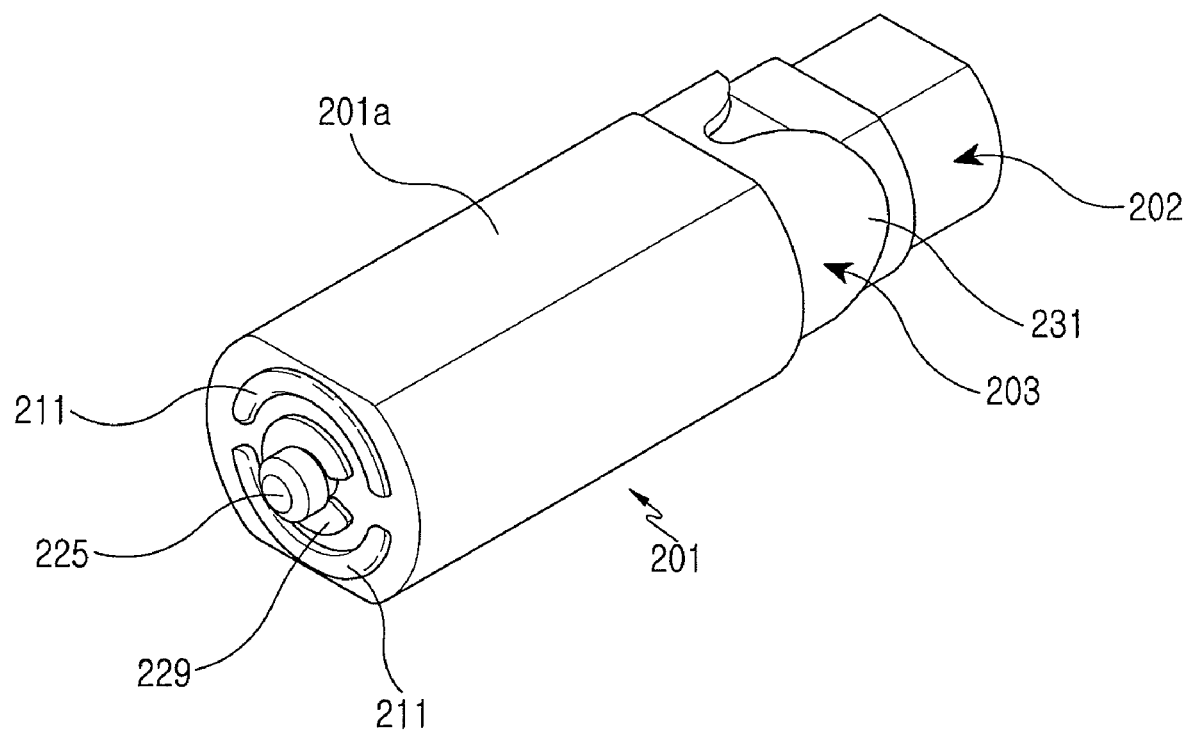
FIG. 3 is an assembled perspective view of the hinge apparatus of FIG. 2.
Figure 4:
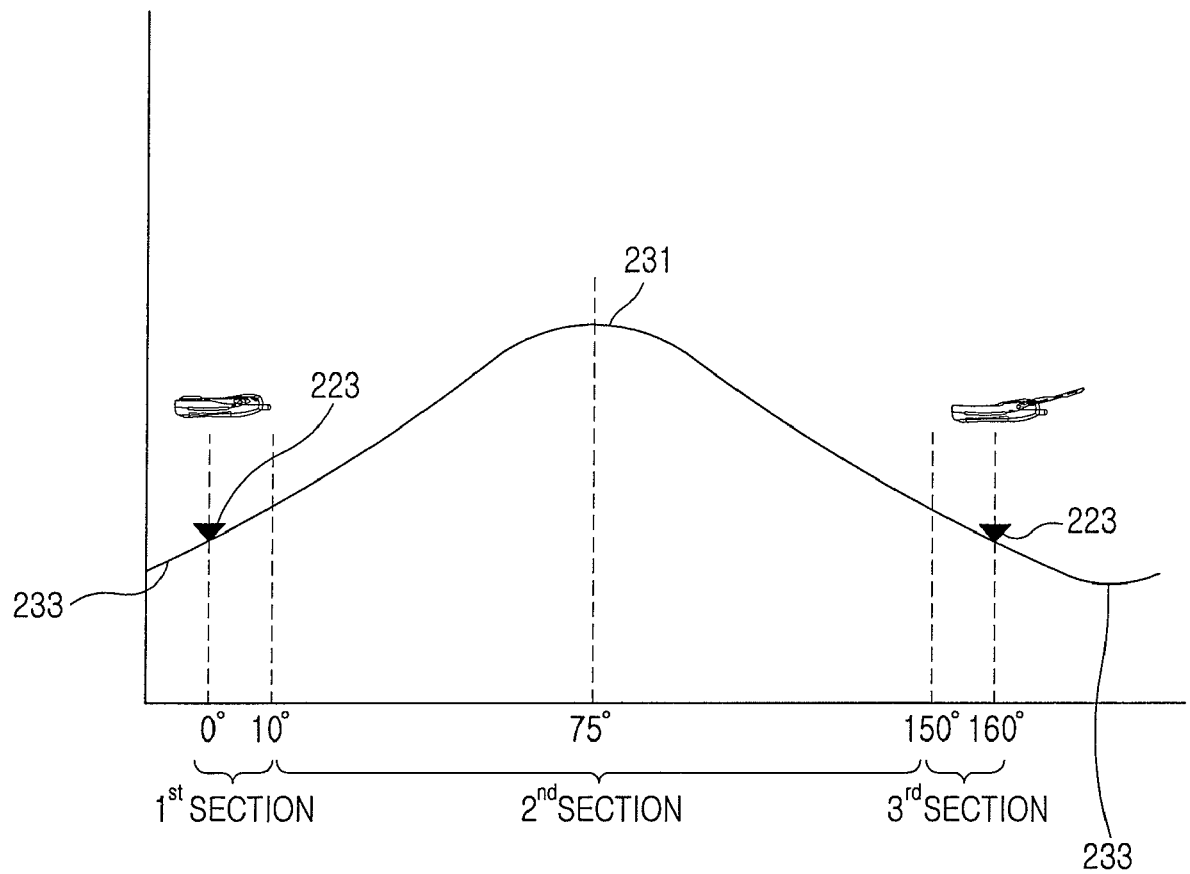
FIG. 4 is a diagram illustrating the operation of the hinge device illustrated in FIG. 2 and a portable terminal having the same.

As illustrated in FIGS. 2 to 4, the hinge apparatus 200 includes a hinge housing 201 and a damping member 205 received within the hinge housing 201. The damping member 205 rotates relative to the hinge housing 201 when the second housing 102 rotates. The hinge housing 201 has at least one guide groove 211 on an internal wall thereof, and the damping member 205 has at least one friction projection 253. In the illustrated exemplary embodiment, the damping member 205 has a pair of frictional projections 253 and the hinge housing 201 has a pair of guide grooves 211. When the second housing 102 rotates, the frictional projections 253 are capable of moving in the guide grooves 211. The frictional projections 253 move out from the guide grooves 211 over an interval from a position where the second housing 102 is folded onto the first housing 101, and over an interval from a position where the second housing 102 is stopped while it is being rotated away from the first housing 101, thereby rubbing against the internal wall of the hinge housing 201. Therefore, even if the second housing 102 is provided with driving force during its rotation relative to the first housing 101, the driving force is dampened at the moment the second housing 101 is folded onto the first housing (i.e., is closed) or at the moment the second housing 101 is stopped in the process of being rotated away from the first housing 101 (i.e. is opened).

The hinge housing 201 is cylindrical, extends along the hinge axis A, and has flat faces 201a on the outer circumferential surface thereof. The hinge hole 127 has a shape complementary with the shape of the hinge housing 201 so that the hinge housing 201 fits into the hinge hole 127. Therefore, the hinge housing 201 rotates about the hinge axis A when the second housing 102 rotates relative to the first housing 101.

The hinge housing 201 is closed at one end thereof and open at the other end. The guide grooves 211 are formed on the internal wall of the closed end and extend by a predetermined angle along the circumferential direction of the hinge housing 201. The angular extension range of the guide grooves 211 will be described in more detail in connection with the description of the opening and closing operation of the terminal 100.

The damping member 205 is circular and plate shaped and is positioned to contact the internal wall of the hinge housing 201. The projections 253 on the face of the damping member face the internal wall. The damping member 205 is rotatably received within the hinge housing 201 so that the damping member 205 rotates relative to the hinge housing 201 when the second housing 102 rotates. The pair of frictional projections 253 are symmetrically arranged with reference to the rotational axis of the damping member 205, i.e., with reference to the hinge axis A.

When the second housing 102 rotates, the frictional projections 253 move within the guide grooves 211 or move out of the guide grooves 211, contacting the internal wall of the hinge housing 201.

The frictional projections 253 contact the internal wall of the hinge housing 201 from the opposite ends of the rotational extent of the second housing 102, and move in the guide grooves 211 between the frictional sections. In the following description of an exemplary embodiment of the present invention, the frictional sections where the frictional projections 151 rub against the internal wall of the hinge housing 201 are referred to as first and third sections, respectively, and the section where the frictional projections 253 move in the guide grooves 211 is referred to as a second section.

In addition, for illustrative purposes, it is assumed that the first section is a section extending away from the position where the second housing 102 is folded onto the first housing 101 until the second section, the second section is a section extending from the first section in the direction the second housing 102 moves away from the second housing 102, and the third section is a section extending from the end of the second section to the position where the second housing 102 is stopped when it rotates away from the first housing 101.

In the illustrated embodiment, a pair of guide grooves 211 are provided and are arranged symmetrical to each other with reference to the hinge axis A. Each of the guide grooves 211 extends about 140 degrees along the circumferential direction of the hinge housing 201. According to an exemplary embodiment, if each of the guide grooves 211 extends about 140 degrees, the second housing 102 is opened by about 160 degrees relative to the first housing 102. This is because each of the frictional sections, over which the frictional projections 201 contact the internal wall of the hinge housing 201, extends about 10 degrees at the rotational extent of the second housing 102.

If the second housing 102 is adapted to rotate by receiving a driving force from the hinge apparatus 200, the driving force will be dampened by the friction of the frictional projections 253 at the first and third sections. At the second section, however, the frictional projections 253 are positioned within the guide grooves 211. As a result, no frictional force is produced, and the second housing is rotated by the driving force received from the hinge apparatus 200.

At this time, a lubricant such as grease may be introduced between the damping member 205 and the internal wall of the closed end of the hinge housing 201 to minimize friction between the damping member 205 and the internal wall of the closed end. Even if the lubricant is introduced between the damping member 205 and the internal wall of the closed end, the frictional projections 253 contact the internal wall of the closed end, thereby dampening the driving force supplied to the second housing 102 because the frictional projections are adapted to come into point-contact with the internal wall of the closed end.

Of course, the angular extension of each of the guide grooves 211 can be varied, depending on the angular rotating range of the second housing 102 and the angular frictional range of the frictional projections 253.

For example, if the angular rotatable range of the second housing 102 is limited to 150 degrees, and the frictional ranges for the frictional projections 253 at the opposite ends of the second housing rotating section are set to 10 degrees, each of the guide grooves 211 will extend about 130 degrees. In addition, the angular frictional range of each frictional projection 253 can be varied within the range of 10 degrees. For example, if the second housing 102 is adapted to be opened up to 160 degrees, the frictional range of each frictional projection 253 may be set to 5 degrees. In such a case, each of the guide grooves 211 can extend up to 150 degrees.

Consequently, the angular rotatable range of the second housing 102, the angular range of the frictional section of each frictional projection 253, and the angular range of the extension of each guide groove 211 can all be varied.

Meanwhile, the hinge apparatus 200 includes a hinge shaft 202, a hinge cam 203, and an elastic member 204 to supply driving force to the second housing 102. One end of the elastic member 204 is supported on the damping member 205 and provides an elastic force for biasing the damping member 205 into contact with the internal wall of the closed end of the hinge housing 201.

The hinge shaft 202 has a hinge projection 221 at a first end and a peak-shaped part 223 at a second end, and rotatably engages with the hinge housing 201. A connection shaft 225 extends from the second end of the hinge shaft 201 along the hinge axis A. The connection shaft 225 extends through the hinge cam 203, the elastic member 204, and the damping member 205, and projects from the closed end 201 of the hinge housing 201 through a hole 213 in the closed end. A coupling groove 227 is formed at the end of the connection shaft 225. The coupling groove 227 is exposed to the outside of the closed end of the hinge housing 201, and a support member 229 is engaged in the coupling groove 227 and abuts against the external wall of the closed end of the hinge housing 201. As a result, the hinge shaft 202 is rotated relative to the hinge housing 201 and is held in place with respect to the hinge housing 201.

The hinge projection 221 projects from the first end of the hinge housing 201, and the hinge housing 201 is mounted in the center hinge arm 125. The hinge projection 221 is connected to one of the side hinge arm 115. By fitting the hinge housing 201 in the center hinge arm 125 and connecting the hinge projection 221 to the side hinge arm 115 in the state in which the hinge shaft 202 is rotatably restrained by the hinge housing 201, the second housing 102 is connected to the first housing 101.

Meanwhile, the external circumferential surface of the connection shaft 225 has flat surfaces 226, and the damping member 205 has a through-hole 251, the shape of which corresponds to the cross-section of the connection shaft 225. The connection shaft 225 engages the damping member 205 through the through-hole 251, and the damping member 205 fits on the connection shaft in such a manner that the damping member 205 is restrained from rotation but is linearly movable on the connection shaft. Therefore, the damping member 205 is only linearly movable on the first housing 101 and is restrained from rotating, and when the second housing 102 rotates, the damping member 205 rotates relative to the hinge housing 201.

The hinge cam 203 is linearly movably received in the hinge housing 201, and contacts the hinge shaft 202 by the elastic force of the elastic member 204. Consequently, the elastic member 204 provides elastic force in a state in which it is supported by the hinge cam 203 at one end and supported by the damping member 205 at the other end. With the elastic force of the elastic member 204, the damping member 205 contacts the internal wall of the hinge housing 201 and the hinge cam 203 contacts the hinge shaft 202.

The hinge cam 203 has flat faces on the circumferential surface thereof so that the shape of the hinge cam 203 is complementary with that of the hinge housing 201. As a result, the hinge cam 203 is allowed to perform linear movement, but is restrained from rotation within the hinge housing 201. The hinge cam 203 has a pair of peak-shaped parts 231 and a valley-shaped 233 part between the peak-shaped parts 231, which are formed at one end of the hinge cam 203. A hole 239 is formed through the hinge cam 203 in the direction of the hinge axis A so as to provide a path for the connection shaft 225.

Because the hinge cam 203 contacts the hinge shaft 202 due to the elastic force of the elastic member 204, the valley-shaped part 233 and the peak-shaped part 223 of the hinge shaft engage each other. At this time, if the hinge shaft 202 rotates and the peak-shaped part 223 is disengaged from the valley-shaped part 233, the elastic force of the elastic member 204 presses the hinge cam 203 into contact in the direction of the hinge shaft 202, and the hinge shaft 202 rotates in a direction allowing the peak-shaped part 223 to engage the valley-shaped part 233, thereby producing a driving force.

Consequently, when the peak-shaped part 223 of the hinge shaft is disengaged from the valley-shaped part 233, the hinge apparatus 200 produces a driving force for rotating the hinge shaft 202 in a direction allowing the peak-shaped part 223 of the hinge shaft 202 to engage the valley-shaped part 233.

The operation of opening and closing the portable terminal 100 with the above-mentioned hinge apparatus will be described below with reference to FIG. 4. FIG. 4 is a cam diagram illustrating the operation of the hinge cam 203.

As mentioned above, the second housing 102 can be opened up to 160 degrees from the position where it is folded onto the first housing 101 according to an exemplary embodiment of the present invention, wherein the second section corresponding to the guide grooves 211 extends by about 140 degrees, and the first and third sections are set to about 10 degrees, respectively.

When the second housing 102 is folded onto the first housing 101, the peak-shaped part 223 of the hinge shaft 202 is stopped at a position where it rotates about 10 degrees from the position where it engages the valley-shaped part 233. Therefore, the hinge apparatus 200 produces a driving force acting in a direction allowing the peak-shaped part 223 of the hinge shaft to engage the valley-shaped part 233, wherein the driving force acts as a force for stably holding the second housing 102 folded onto the first housing 101.

When the second housing 102 has been folded onto the first housing 101, the frictional projections 251 are positioned out of the guide grooves 211 so that they contact the internal wall of the hinge housing 201. When a user rotates the second housing 102 away from the first housing 101, the peak-shaped part 223 of the hinge shaft 202 moves toward the top point of the corresponding peak-shaped part 231 of the hinge cam 203 along the slope of the valley-shaped part 233.

The top point of the peak-shaped parts 231 of the hinge cam 203 is positioned at a point corresponding to the position of the second housing opened about 75 degrees from the first housing 101. The peak-shaped part 223 of the hinge shaft 202 is positioned on the slope between the top point and the valley-shaped part 233 while the second housing 102 moves from its folded position to its 75 degrees opened position, and the hinge apparatus 200 produces a driving force acting in the direction of urging the first housing 101 to be folded onto the first housing 101.

That is, if the second housing 102 rotates within a range of 75 degrees from the first housing 101, the hinge apparatus 200 provides a driving force acting in the direction allowing the second housing 102 to be folded onto the first housing 101. The section where the hinge apparatus 200 provides a driving force acting in the direction for urging the first housing 102 to be folded onto the first housing will be referred to as a "closing movement section."

If the second housing 102 additionally rotates and the peak-shaped part 223 moves beyond the top point of the corresponding peak-shaped part 231 of the hinge cam 203, the hinge apparatus 200 provides a driving force in the direction for rotating the second housing 102 away from the first housing 101. This is because the hinge shaft 202 rotates in the direction for urging its peak-shaped part 223 to engage the valley-shaped part 233. At this time, the direction of rotating the hinge shaft 202 is changed by the cam diagram of the hinge cam. The section where the hinge apparatus 200 provides a driving force acting in the direction for urging the first housing to rotate away from the first housing will be referred to as an "opening movement section."

Consequently, within the rotational range from the position folded onto the first housing 101 to the 160 degrees opened position, the second housing 102 receives driving force acting in a direction for urging the second housing 102 to be folded onto the first housing 101 or to move away from the first housing 101, depending on the angle to which it is opened.

Because a conventional hinge apparatuses supplies a driving force merely by converting elastic force provided by an elastic member into a rotational force, a separate shock absorbing material for dampening the impact produced at the moment one housing of a terminal is folded onto the other housing or at the moment the rotation of one housing is stopped while being opened is typically provided.

The hinge apparatus 200 according to the exemplary embodiment of the present invention includes the damping member 205 to dampen the driving force at the moment the rotation of the second housing 102 is stopped. That is, the driving force is dampened when the second housing 102 is folded onto the first housing 101 or when the second housing is completely opened by about 160 degrees. As a result, the impact and load applied to the terminal 100 can be reduced.

In the first section from the folded position onto the first housing 101 to the 10 degrees opened position of the second housing 102, the damping member 205 produces a frictional force so as to dampen the driving force for rotating the second housing 102. In addition, in the third section, from the 160 degrees opened position from the first housing 101 to the 150 degrees opened position of the second housing 102, the damping member 205 also produces a frictional force so as to dampen the driving force for rotating the second housing 102.

In the second section, the frictional projections 253 are positioned within the guide grooves 211 and do not produce a frictional force. As a result, the second housing 102 is rotated by the driving force rotating the hinge shaft 202.

Meanwhile, the angle of the first section is smaller than that of the closing movement section while the first section is included in the closing movement section. Likewise, the angle of the second section is an angle smaller than that of the opening movement section while the second section is included in the opening movement section. That is, the guide grooves 211 partially overlap with the closing movement section as well as with the opening movement section. Therefore, the damping member 205 produces the frictional force only at a part of the closing movement section and a part of the opening movement section, where the guide grooves 211 do not overlap with the closing movement section and the opening movement section, so as to dampen the driving force produced by the hinge apparatus 200.

When the second housing 102 rotates in the direction to be folded onto the first housing 102, the damping member 205 produces the frictional force from the moment the frictional projections 251 move out of the guide grooves 211 and enter the third section, so as to dampen the driving force produced by the hinge apparatus 200. From the moment the frictional projections 251 move out of the guide grooves 211 and enter the third section to the moment the second housing 102 is stopped after rotating 160 degrees, the rotating velocity of the second housing 102 is gradually reduced.

Consequently, at the moment the second housing 102 is folded onto the first housing 101 or is stopped to rotate at the 160 degree point, the load applied to the various components of the terminal, such as the side hinge arms 115 and the center hinge arm 125, is dampened.

As described above, the hinge apparatus for a portable terminal according to an exemplary embodiment of the present invention dampens the impact produced at the moment the housings of the terminal are folded or stopped to rotate after being opened from each other by a predetermined angle, thereby preventing damage to the circuit devices. In addition, by dampening the repeated load applied to the side hinge arms and the like when the terminal is repeatedly opened and closed, the hinge apparatus improves the endurance and the structural stability of the terminal. Moreover, the costs required for testing the endurance and the structural stability in the process of manufacturing terminals, and the costs required for maintaining and repairing such terminals, can be reduced.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A hinge apparatus for a portable terminal comprising a first housing and a second housing folded onto the first housing to be opposed to the first housing or rotated away from the first housing, the hinge apparatus rotatably connecting the second housing to the first housing and providing driving force for urging the second housing to be folded onto the first housing or to be rotated away from the first housing, depending on a rotational angle of the second housing, the hinge apparatus comprising:
   a hinge housing associated with the second housing, the hinge housing comprising an internal wall with at least one guide groove extending in a circumferential direction; and
   a damping member rotatably received in the hinge housing and rotated as the second housing rotates, the damping member comprising at least one frictional projection,
   wherein in a first section extending in a direction away from the position where the second housing is folded onto the first housing, the at least one frictional projection contacts the internal wall of the hinge housing, and
   wherein in a second section extending away from the first housing from an end of the first section, the at least one frictional projection is received in the at least one guide groove and moves along the at least one guide groove, and
   wherein in a third section extending from an end of the second section to a position where the rotation of the second housing is stopped after rotating away from the first housing, the at least one frictional projection contacts the internal wall of the hinge housing.

2. A hinge apparatus as claimed in claim 1, wherein the first section extends no more than approximately 10 degrees in the direction the second housing rotates away from the first housing from the position where the second housing is folded onto the first housing.

3. A hinge apparatus as claimed in claim 1, wherein the third section extends no more than approximately 10 degrees in the direction the second housing moves toward the first housing from the position where the second housing is stopped after rotating away from the first housing.

4. A hinge apparatus as claimed in claim 3, wherein the second housing is adapted to rotate about 150 to 160 degrees in the direction the second housing moves away from the position folded onto the first housing.

5. A hinge apparatus as claimed in claim 1, wherein the at least one guide groove extends by approximately 130 to 150 degrees in the circumferential direction of the hinge housing.

6. A hinge apparatus as claimed in claim 5, wherein the at least one guide groove comprises a pair of guide grooves on the internal wall of the hinge housing and the pair of guide grooves are symmetrically arranged with reference to the rotational axis of the damping member.

7. A hinge apparatus as claimed in claim 1, wherein the hinge housing is closed at one end, and the at least one guide groove is formed on the internal wall of the closed end of the hinge housing.

8. A hinge apparatus as claimed in claim 7, wherein the damping member comprises a circular plate and is opposed to the internal wall of the closed end of the hinge housing.

9. A hinge apparatus as claimed in claim 8, further comprising an elastic member received in the hinge housing, wherein the elastic member supplies an elastic force to urge the damping member into contact with the internal wall of the hinge housing.

10. A hinge apparatus as claimed in claim 9, further comprising a lubricant disposed between the damping member and the internal wall of the hinge housing.

11. A hinge apparatus as claimed in claim 1, further comprising:
   a hinge shaft rotatably engaged in the hinge housing;

a hinge cam linearly movably received in the hinge housing: and a connection shaft extending from the hinge shaft through the hinge cam, wherein the damping member is positioned on the connection shaft so as to rotate together with the hinge shaft.

12. A hinge apparatus as claimed in claim 11, further comprising an elastic member, a first end of which is supported by the damping member and a second end of which is supported by the hinge cam, wherein the elastic member supplies an elastic force to urge the hinge housing into contact with the internal wall of the damping member and to urge the hinge cam into contact with the hinge shaft.

13. A hinge apparatus as claimed in claim 11, further comprising:

a peak-shaped part projecting from an end of the hinge shaft;

a pair of peak-shaped parts projecting from an end of the hinge cam; and a valley-shaped part formed between the peak-shaped parts of the hinge cam, wherein the hinge shaft rotates within the hinge housing so that its peak-shaped part engages the valley-shaped part.

14. A hinge apparatus as claimed in claim 13, further comprising an elastic member, a first end of which is supported by the damping member and a second end of which is supported by the hinge cam, wherein the elastic member provides an elastic force to the hinge cam to urge the hinge cam into contact with the hinge shaft, and the elastic force of the elastic member is converted into a driving force to rotate the hinge shaft so that its peak-shaped part engages the valley-shaped part.

15. A hinge apparatus as claimed in claim 11, further comprising:

a coupling groove formed on an end of the connection shaft; and a support member engaged in the coupling groove, wherein the connection shaft extends through the hinge housing and projects from an end of the hinge housing, and the support member abuts an external wall of the end of the hinge housing.

16. A portable terminal comprising a first housing, a second housing rotatable relative to the first housing, and a hinge apparatus rotatably connecting the second housing to the first housing and providing a driving force for urging the second housing to be folded onto the first housing or to be rotated away from the first housing, depending on a rotational angle of the second housing, wherein the hinge apparatus comprises: a first section in which the driving force of the hinge apparatus urges the second housing to be folded onto the first housing; a third section in which the driving force of the hinge apparatus urges the second housing to be rotated away from the first housing; and a second section between the first and third sections, the driving force of the hinge apparatus urging the second housing to be folded onto the first housing or to be rotated away from the first housing, depending on a rotational angle of the second housing in the second section, wherein the hinge apparatus provides a frictional force in the first and third sections.

17. A portable terminal as claimed in claim 16, wherein a position where the second housing is folded onto the second housing corresponds to an end of the first section.

18. A portable terminal as claimed in claim 16, wherein a position where the second housing is stopped after rotating away from the first housing corresponds to an end of the third section.

19. A portable terminal as claimed in claim 16, wherein the hinge apparatus comprises:

a hinge housing associated with the second housing, the hinge housing comprising an internal wall with at least one guide groove extending in a circumferential direction; and a damping member rotatably received in the hinge housing and rotated together with the second housing, the damping member comprising at least one frictional projection, wherein in the first and third sections, the at least one frictional projection contacts the internal wall of the hinge housing.

20. A portable terminal as claimed in claim 19, wherein at least one guide groove is disposed in an area corresponding to the second section, and when the second housing rotates in the second section, the at least one frictional projection is disposed in the at least one guide groove.

21. A portable terminal as claimed in claim 20, wherein the first section extends no more than approximately 10 degrees in the direction of rotation of the second housing away from the first housing from the position where the second housing is folded onto the first housing.

22. A portable terminal as claimed in claim 20, wherein the third section extends no more than approximately 10 degrees in the direction of rotation of the second housing toward the first housing from the position where the second housing is stopped after rotating away from the first housing.

23. A portable terminal as claimed in claim 22, wherein the second housing is adapted to rotate about 150 to 160 degrees in the direction of moving the second housing away from the position where the second housing folded onto the first housing.

24. A portable terminal as claimed in claim 19, wherein the at least one guide groove extends by 130 to 150 degrees in the circumferential direction of the hinge housing.

25. A portable terminal comprising a first housing, a second housing rotatable relative to the first housing, and a hinge apparatus rotatably connecting the second housing to the first housing and providing a driving force for urging the second housing to be folded onto the first housing or to be rotated away from the first housing, depending on a rotational angle of the second housing, wherein the hinge apparatus comprises:

a first section in which the driving force of the hinge apparatus urges the second housing to be folded onto the first housing;

a third section in which the driving force of the hinge apparatus urges the second housing to be rotated away from the first housing; and a second section between the first and third sections, the driving force of the hinge apparatus urging the second housing to be folded onto the first housing or to be rotated away from the first housing, depending on a rotational angle of the second housing in the second section, wherein the hinge apparatus provides a frictional force in the first and third sections while the second housing is rotating.

26. A portable terminal, comprising: a first housing; a second housing rotatably connected to the first housing to move between a closed position and an opened position; and a hinge apparatus for rotatably connecting the first and second housings of the portable terminal, the hinge apparatus comprising: a hinge housing engaging the second housing of the portable terminal, the hinge housing comprising an internal wall with at least one guide groove extending in a circumferential direction; and a damping member rotatably received in the hinge housing and rotated as the second housing rotates, the damping member comprising at least one frictional projection for engaging the at least one guide groove, wherein the at least one guide groove is positioned so that the at least one frictional projection contacts the internal wall of the hinge housing in the closed and opened positions and further wherein the second housing travels between a first section, a second section, and a third section, and the at least one guide groove is positioned to receive the at least one frictional projection in the second section.

27. A portable terminal as claimed in claim 26, wherein the at least one guide groove begins at a position corresponding to an about 10 degree opened position of the first and second housings.

28. A portable terminal as claimed in claim 27, wherein at least one guide groove ends at a position corresponding to about 10 degrees less than a completely opened position of the first and second housings.

29. A portable terminal as claimed in claim 28, wherein the at least one guide groove extends about 150 degrees.

30. A portable terminal as claimed in claim 26, wherein the first section corresponds to an approximately 0 to 10 degree opened position, the second section corresponds to an approximately 10 to 150 degree opened position, and the third section corresponds to an approximately 150 to 160 degree opened position.

31. A portable terminal as claimed in claim 26, wherein in the first section, the hinge apparatus urges the housings closed, in the third section, the hinge apparatus urges the housings opened, and in the second section, the hinge apparatus urges the housings opened or closed depending on the position of the housings.

* * * * *